(12) United States Patent
Miyahara et al.

(10) Patent No.: US 12,023,607 B2
(45) Date of Patent: Jul. 2, 2024

(54) CERAMIC FILTER AND MANUFACTURING METHOD THEREFOR

(71) Applicant: KABUSHIKIGAISYA PROZEAL, Aichi (JP)

(72) Inventors: Moriaki Miyahara, Aichi (JP); Yoshitaka Yamamoto, Aichi (JP)

(73) Assignee: KABUSHIKIGAISYA PROZEAL, Aichi (JP)

( * ) Notice: Subject to any disclaimer, the term of this patent is extended or adjusted under 35 U.S.C. 154(b) by 864 days.

(21) Appl. No.: 17/048,690

(22) PCT Filed: Jul. 9, 2018

(86) PCT No.: PCT/JP2018/025934
§ 371 (c)(1),
(2) Date: Oct. 19, 2020

(87) PCT Pub. No.: WO2020/012544
PCT Pub. Date: Jan. 16, 2020

(65) Prior Publication Data
US 2021/0331096 A1 Oct. 28, 2021

(51) Int. Cl.
*B01D 29/11* (2006.01)
*B01D 39/20* (2006.01)
(Continued)

(52) U.S. Cl.
CPC ........ *B01D 29/111* (2013.01); *B01D 39/2075* (2013.01); *B22D 43/00* (2013.01);
(Continued)

(58) Field of Classification Search
CPC .............. B01D 29/111; B01D 39/2075; B01D 2239/10; B01D 2239/1241;
(Continued)

(56) References Cited

U.S. PATENT DOCUMENTS 3,351,123 A * 11/1967 Payne ...................... B22C 3/00
164/235
4,278,544 A * 7/1981 Takashima .............. C04B 38/00
55/523
(Continued)

FOREIGN PATENT DOCUMENTS

CN 102126800 * 8/2012 .......... B01D 29/111
CN 102795885 * 11/2012
(Continued)

OTHER PUBLICATIONS

CN102126800 English machine translation version (Year: 2012).*
(Continued)

*Primary Examiner* — Jessee R Roe
*Assistant Examiner* — Michael Aboagye
(74) *Attorney, Agent, or Firm* — Polson Intellectual Property Law P.C.; Margaret Polson; Christopher Sylvain

(57) ABSTRACT

In order to enable stable provision of an upward release tube-type ceramic filter used in a molten metal bath and having a side wall with a height of 300 mm or greater, this method for manufacturing a ceramic filter, which is an upward release tube-type integrally molded article for removing unwanted substances from molten metal, has: a step for kneading a mixture of an aggregate comprising ceramic particles, a prescribed binding agent, and water to prepare a base material; a step for integrally forming an upward release tube-type ceramic filter precursor from the prepared base material; step for drying the precursor; a step for providing a retainer for the dried precursor for supporting a side wall of the precursor; a step for subsequently sintering the precursor; and a step for removing the retainer after sintering.

12 Claims, 3 Drawing Sheets

(51) Int. Cl.
- *B22D 43/00* (2006.01)
- *B28B 7/36* (2006.01)
- *B28B 11/24* (2006.01)
- *C04B 35/565* (2006.01)
- *C04B 35/63* (2006.01)
- *C04B 35/634* (2006.01)
- *C04B 35/64* (2006.01)

(52) U.S. Cl.
CPC ............ *B28B 7/364* (2013.01); *B28B 11/243* (2013.01); *C04B 35/565* (2013.01); *C04B 35/6303* (2013.01); *C04B 35/63416* (2013.01); *C04B 35/64* (2013.01); *C04B 2235/3217* (2013.01); *C04B 2235/36* (2013.01); *C04B 2235/3826* (2013.01); *C04B 2235/5427* (2013.01); *C04B 2235/6028* (2013.01); *C04B 2235/606* (2013.01); *C04B 2235/9676* (2013.01)

(58) Field of Classification Search
CPC ... B01D 39/2079; B22D 43/00; B28B 11/041; B28B 11/243; B28B 11/248; B28B 7/348; B28B 7/364; C04B 2235/606; C04B 35/64; C04B 35/565; C04B 35/63416; C04B 35/6303; C04B 35/62655; C04B 35/575; C04B 2235/3826
USPC .............................. 266/161, 227, 274, 275
See application file for complete search history.

(56) References Cited

U.S. PATENT DOCUMENTS

| | | | | |
|---|---|---|---|---|
| 4,528,099 | A | * | 7/1985 | Rieger ............... B01D 39/2075 210/500.1 |
| 4,678,758 | A | * | 7/1987 | Kampfer ................. C22B 9/023 501/80 |
| 5,935,887 | A | * | 8/1999 | Sudo ................. C04B 35/62655 210/500.25 |
| 2005/0199560 | A1 | | 9/2005 | Jagt |
| 2009/0224441 | A1 | * | 9/2009 | Dodds ................... F27D 3/0021 264/607 |

FOREIGN PATENT DOCUMENTS

| | | | |
|---|---|---|---|
| JP | 04-013043 U1 | | 2/1992 |
| JP | H11123527 A | | 5/1999 |
| JP | 2000355011 A | | 12/2000 |
| JP | 2017214268 | * 12/2017 | ........... B01D 29/111 |
| JP | 2017214268 A | | 12/2017 |
| KR | 10-2008-0034412 | | 4/2008 |

OTHER PUBLICATIONS

International Search Report dated Jan. 16, 20200 in parent International application PCT/JP2018/025934.
Written Opinion of the International Searching Authority dated Jan. 16, 20200 in parent International application PCT/JP2018/025934.
Office Action dated Jun. 24, 2021 in related Chinese patent application 201880093006.4.
Office Action dated Jul. 12, 2022 in related Japanese patent application 2020-109188.

* cited by examiner

CERAMIC FILTER AND MANUFACTURING METHOD THEREFOR

TECHNICAL FIELD

The present invention relates to a ceramic filter and a manufacturing method therefor. More specifically, the present invention relates to the improvement of a ceramic filter for removing contaminant from molten metal such as aluminum.

BACKGROUND ART

A ceramic filter is used to remove contaminant from the molten metal of aluminum (including an alloy thereof; the same applies hereinafter).

A conventional ceramic filter is a plate-shaped member obtained by sintering an aggregate including ceramic particles with the use of a binding agent. Such plate-shaped members are combined to form a bottom-closed tube having a rectangular plan view, that is, an open-topped tube, and the tube is immersed in the aluminum molten metal bath.

Patent Literature 1 proposes an integrally-formed open-topped tubular ceramic filter. Such a ceramic filter is more mechanically stable than a ceramic filter obtained by combining plate-shaped members. Therefore, this ceramic filter has improved durability when used under a severe environment like inside the molten metal of aluminum.

CITATIONS LIST

Patent Literature

Patent Literature 1: JP 2017-214268 A

SUMMARY OF INVENTION

Technical Problems

However, as a result of studies by the present inventors, a tall integrally-formed three-dimensional ceramic filter could not be obtained by the manufacturing method disclosed in Patent Literature 1. More specifically, a product having a side wall whose height was 300 mm or more could not be obtained due to the collapse of the side wall.

An aggregate including ceramic particles, a binder, and water are kneaded to prepare dough, and an integrally-formed three-dimensional structure, that is, an open-topped tube is formed using the dough. At this time, the wall of the tube cannot be made thick to allow the molten metal of aluminum to pass through it. Therefore, the side wall made of the dough before sintering is fragile and likely to deform or collapse due to convection of atmosphere air or a change in internal stress caused during sintering. For this reason, it is considered that when the height of the side wall made of the dough before sintering is 300 mm or more, the side wall collapses during sintering.

Solutions to Problems

In order to solve the above problem, the present inventors have intensively studied, and as a result have conceived the following aspects of the present invention.

A first aspect of the present invention is defined as follows. A method for manufacturing an integrally-formed open-topped tubular ceramic filter for removing contaminant from molten metal, the method including the steps of:

kneading a mixture of an aggregate including ceramic particles, a predetermined binding agent, and water to prepare dough;
integrally forming a precursor of an open-topped tubular ceramic filter from the prepared dough;
drying the precursor;
setting up a retainer for the dried precursor to support a side wall of the precursor;
subsequently sintering the precursor; and
removing the retainer after sintering.

According to the method for manufacturing a ceramic filter as defined in the first aspect, the side wall of the precursor is supported by the retainer during sintering, and therefore does not collapse even when having a height as large as 300 mm or more or 500 mm or more.

Here, the retainer preferably includes a first retainer for supporting the side wall from the outside thereof and a second retainer for supporting the side wall from the inside thereof. In this case, the first retainer for supporting the side wall from the outside thereof is preferably configured to support the entire surface of the peripheral side wall. At this time, the second retainer may be configured to intermittently support the side wall.

A second aspect of the present invention is defined as follows. The manufacturing method as defined in the first aspect further including, before the sintering step and after the drying step, the step of coating the side wall of the precursor with a layer made of a material that is stable against the molten metal and an oxide thereof and that has a sintering temperature lower than a sintering temperature of the dough of the precursor.

According to the manufacturing method as defined in the second aspect, the material of the coating layer has a sintering temperature lower than that of the dough, and is therefore first vitrified during sintering to have increased mechanical rigidity. The vitrified coating layer supports the side wall of the precursor during sintering. This prevents the collapse of the side wall.

From such a viewpoint, an integrated coating layer is preferably formed on at least one side of the entire side wall of the precursor. More preferably, the coating layer is formed on the upper edge side of the outer surface and inner surface of the side wall. The width of the coating layer is not particularly limited. For example, the coating layer may be laminated on the entire surface of the side wall. This is because in the case of an open-topped tubular ceramic filter, molten metal enters the inside of the filter almost exclusively through the bottom wall of the filter. The coating layer may extend to the periphery of the bottom wall without inhibiting the passage of the molten metal. The coating layer preferably has a width of 50 to 400 mm.

The thickness of the coating layer is not particularly limited as long as mechanical strength required to prevent the collapse of the side wall is achieved, and may be, for example, 0.1 mm to 5.0 mm.

As the material of the coating layer, a material is used which does not react with the molten metal and an oxide thereof and which has a sintering temperature lower than that of the material of the precursor. When aluminum is selected as the molten metal, the material of the coating layer can be used that may not react with aluminum and alumina, for example, a dispersion of zirconium oxide, zircon, or the like in a binding agent can be used. The binding agent mainly contains, for example, alumina having a vitrification temperature lower than that of the dough.

A third aspect of the present invention is defined as follows. An integrally-formed open-topped tubular ceramic filter including a sintered body of ceramic particles capable of allowing molten metal to pass therethrough, the ceramic filter having a bottom wall and a side wall vertically extending from the bottom wall so as to have a height of 500 mm or more.

The ceramic filter having such a structure can be obtained by implementing the already-described manufacturing methods as defined in the first and second aspects. In this ceramic filter, the side wall vertically extends from the bottom wall. This makes it possible to maximize the area of the bottom wall in a molten metal bath having a limited area. When the ceramic filter is immersed in a molten metal bath, molten metal passes almost exclusively through the bottom wall. Therefore, the filtering capability of the ceramic filter can be maximized by maximizing the area of the bottom wall.

In such a ceramic filter, a protective film is preferably laminated on the upper edge of an opening provided at the top of the ceramic filter. The protective film is made of a material that is stable against the molten metal and an oxide thereof and that has a sintering temperature lower than that of the ceramic particles.

An oxide is formed on the surface of the molten metal, and the metal oxide is likely to react with the ceramic particles. Therefore, the independence of the ceramic filter in the molten metal can be secured by coating the upper edge of the side wall with a protective film stable against the metal oxide and the molten metal itself. Further, as described above with reference to the second aspect, production of the ceramic filter is stabilized by forming a coating layer from a material having a sintering temperature lower than that of the ceramic particles.

DESCRIPTION OF EMBODIMENT

Dough of a precursor contains an aggregate including ceramic particles, a predetermined binding agent, and water.

The aggregate are used in any ratio with regard to the dough and, for example, comprises one or more materials selected from the group consisting of silicon carbide, silicon nitride, boron nitride, zirconium oxide (zirconia), aluminum oxide (alumina), and zircon.

The particle diameter of the aggregate may freely be selected according to characteristics required of a ceramic filter, but is preferably 0.01 mm to 10 mm, more preferably 3 mm to 6 mm. The particle diameter can be determined by common sieves.

As the binder, an organic binding agent, inorganic cement, and powdered glass may be used.

The organic binding agent binds the aggregate before sintering to retain the shape thereof.

As such an organic binding agent, a water-soluble and viscosity improving agent such as polyvinyl alcohol or starch may be used.

The viscosity improving agent is burnt off by sintering, and therefore inorganic cement is used to bind the aggregate during sintering. As the inorganic cement, silica-free inorganic cement (alumina cement) is preferably used. This is because that the inorganic cement does not react with molten metal, especially with an oxide thereof.

The powdered glass is vitrified by sintering and finally binds the aggregate. The powdered glass shall have a vitrification temperature (melting point) sufficiently higher than the temperature of molten metal.

These binding agents are dissolved or dispersed in a predetermined amount of water and mixed with the aggregate. The amount of the organic binding agent is preferably 0.1 to 0.5 mass % with respect to the total mass of the aggregate and the binder. The amount of the inorganic cement is preferably 0.5 to 10 mass %. The amount of the powdered glass is preferably 0.5 to 10 mass %.

The amount of water is appropriately adjusted so that a mixture having a desired viscosity is obtained.

The thus obtained mixture has almost no fluidity. Such a mixture is filled into a mold to integrally form a precursor of a ceramic filter.

Figure 1:
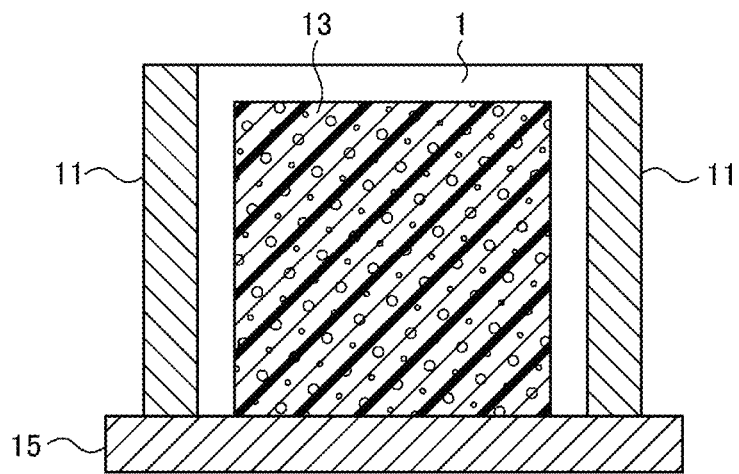
FIG. 1 is a sectional view of a forming mold of a precursor used in an embodiment of the present invention.

FIG. 1 illustrates a mold 10 for forming a precursor 1.

The mold 10 includes an outer mold 11 and an inner mold 13. Reference sign 15 denotes a base. The outer mold 11 is a plate-shaped member and may be made of metal or ceramic. On the cavity surface of the outer mold 11, a releasing agent is applied to easily demold the precursor 1.

As the inner mold 13, a foamed resin is used. A protective film also made of a resin is laminated on the cavity surface of the inner mold 13 to prevent permeation of the mixture. As the protective film, a heat-shrinkable tape or a coating material may be used. On the surface of the protective film, a releasing agent is applied to easily demold the precursor 1.

In the present invention, the precursor 1 is dried before demolding, that is, the precursor 1 is dried with at least the inner mold being left.

The precursor 1 is dried under general conditions of 80° C. to 100° C. for 5 hours to 15 hours. Under such conditions, the foamed resin material thermally shrinks. Therefore, demolding is easily performed even when the precursor 1 has a high side wall.

The shrinkage coefficient of thermal shrinkage of the foamed resin material may be about 1 to 10% as long as the dried precursor 1 can be demolded from the inner mold. Another material having a similar shrinkage coefficient may be used instead of the foamed resin material.

Figure 2:
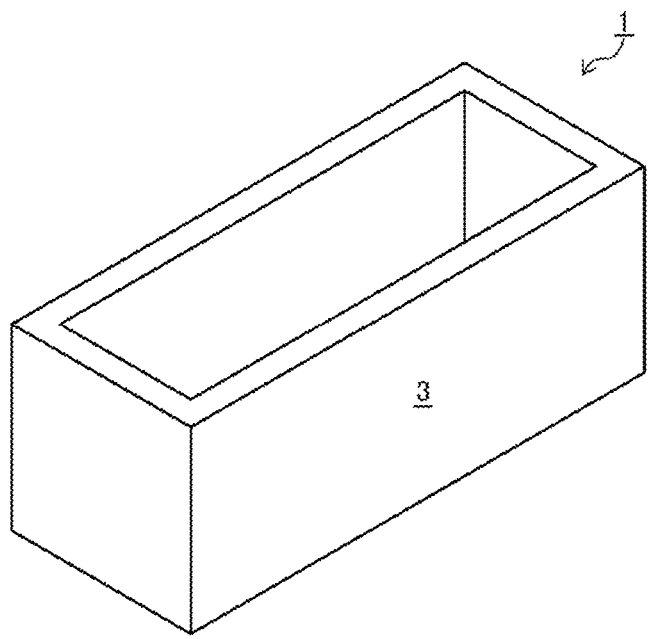
FIG. 2 is a perspective view of the precursor.
Figure 3:
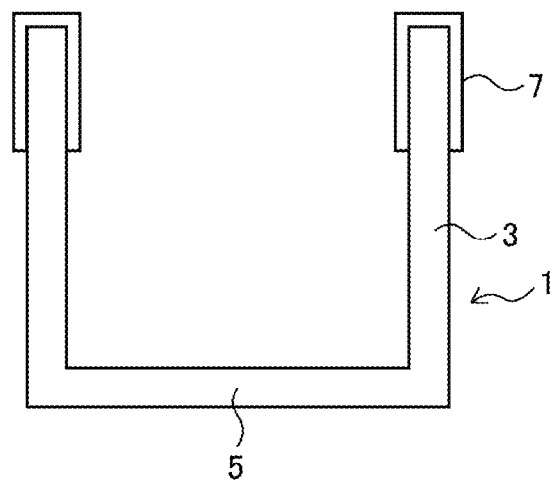
FIG. 3 is a sectional view of the precursor having a protective film.

The whole of the precursor 1 after demolding is shown in FIG. 2. The precursor 1 has a vertical side wall 3 having a height of 500 mm or more. The thickness of the side wall 3 may freely be selected according to characteristics required of a ceramic filter, but is 20 to 35 mm. A bottom wall 5 has the same thickness (see FIG. 3).

The upper edge of the side wall 3 of the precursor 1 is coated with a protective film 7. The coating is performed by application or spraying.

As has been described above, the protective film 7 is made of a material that is stable against molten metal and an oxide thereof and that has a sintering temperature lower than that of the dough of the precursor. An area coated with the protective film 7 may freely be set, but is preferably set so that margins of 100 mm or more are provided above and below the upper surface level of molten metal. Further, the upper edge of the side wall is preferably coated entirely from the viewpoint of ease for application and impartment of strength.

The protective film 7 is vitrified before the dough of the precursor 1, that is, before the powdered glass during sintering of the precursor 1.

Figure 4:
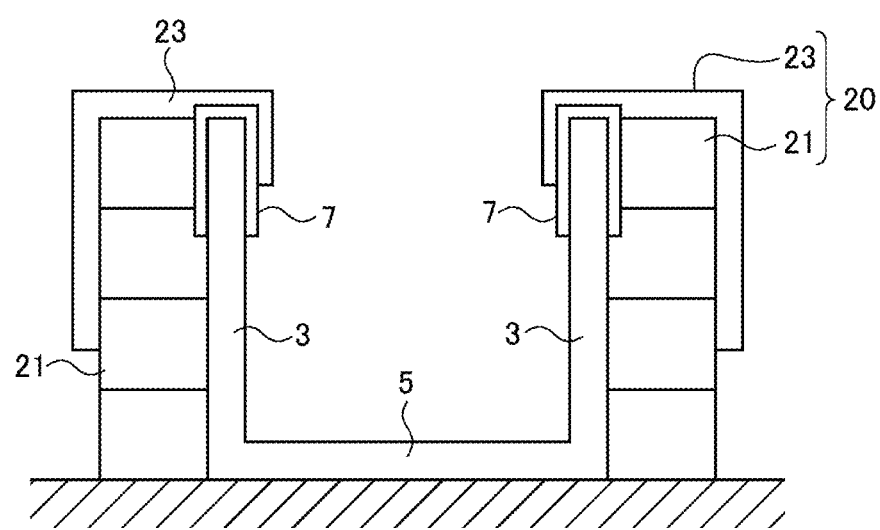
FIG. 4 is a sectional view showing a retainer supporting the precursor during sintering.

The precursor 1 having the protective film 7 is placed in a sintering furnace. At this time, a retainer 20 is set up to prevent the collapse of the side wall 3 (FIG. 4). The retainer 20 includes a first retainer 21 configured to support the side wall 3 from the outside and a second retainer 23 configured to support the side wall 3 from the inside.

The first retainer 21 supports the entire outer surface of the side wall 3. The first retainer 21 is preferably in close contact with the outer surface of the side wall 3. The side wall tends to deform due to expansion during sintering, and therefore the first retainer 21 preferably faces the entire outer surface of the side wall.

The second retainer 23 prevents the side wall from deforming inward. The side wall deforming outward causes to contact the first retainer 21 so that it may rebound inward. The second retainer 23 prevent such the rebounding. The second retainer does not need to face the entire inner surface of the side wall. In this example, the second retainer is provided on the upper edge side of the side wall to support the inner surface of the side wall. The second retainer may intermittently support the inner surface of the side wall. In this example, L-shaped ceramic plates (width: 100 mm) as the second retainer 23 are arranged as closely as possible so as to be fitted to the upper edges of the precursor 1 and the first retainer 21.

When such a retainer 20 is used, the protective film 7 may be omitted.

On the other hand, when the protective film 7 is widely formed (in a vertical direction), the second retainer 23 or the retainer 20 as a set of the retainers may be omitted.

Figure 5:
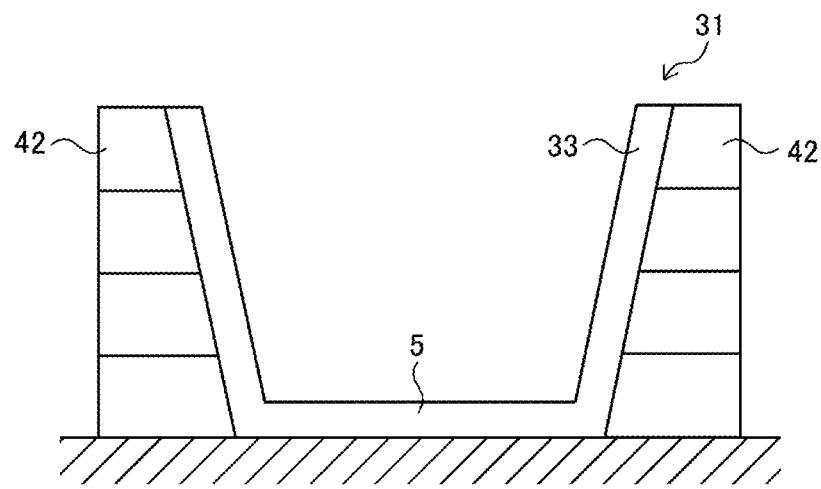
FIG. 5 is a sectional view of a modified embodiment of the precursor during sintering.

FIG. 5 illustrates, as an example, a precursor 31 having a side wall 33 inclined outward. In the case of such a precursor 31, the side wall 33 can be supported only by a first retainer 42 facing the outer surface of the side wall 33 to prevent the deformation of the side wall 33 during sintering.

Figure 6:
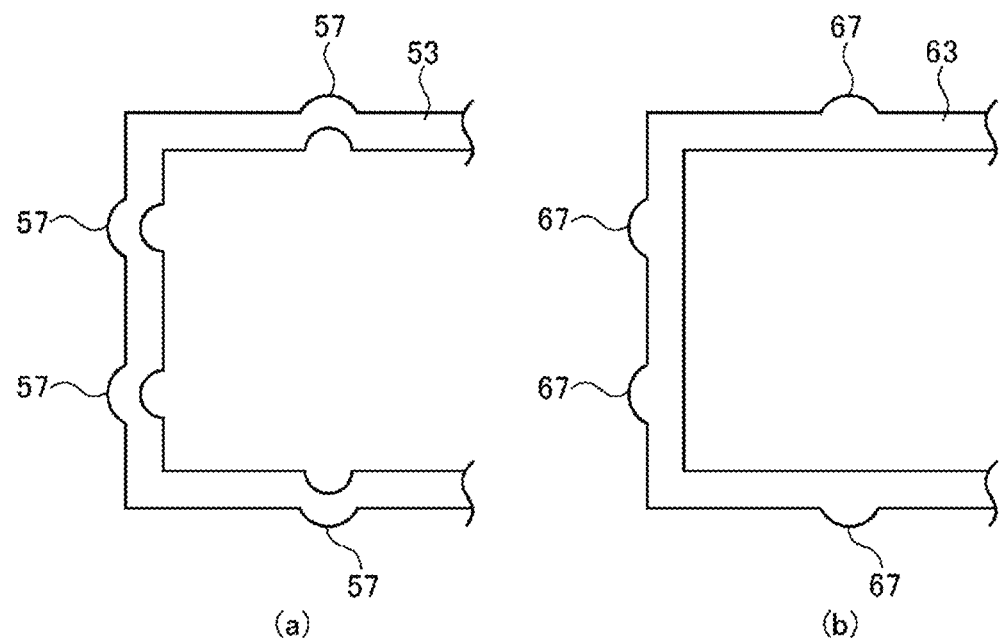
FIG. 6 is a schematic view showing the structure of a side wall of a modified embodiment of the precursor.

The deformation of side wall of the precursor during sintering is caused also by self-weight when the side wall has a height as high as more than 300 mm. However, the side wall cannot be made thicker than a certain thickness because the thickness of the side wall is limited in terms of the ability to allow molten metal to pass through. Therefore, as shown in FIG. 6(a), a side wall 53 may be bent to enhance rigidity in a vertical direction. Alternatively, as shown in FIG. 6(b), ribs 67 may be provided in a side wall 63 so as to be continuous in a vertical direction.

EXAMPLES

Hereinbelow, an example of the present invention will be described.

First, the following mixture was obtained. The following mixing ratio is expressed in parts by mass.

Aggregate 1 (silicon carbide, particle diameter: 3 to 6 mm): 70 parts by mass

Aggregate 2 (silicon carbide, maximum particle diameter: 8 mm): 30 parts by mass Organic binding agent (polyvinyl acetate, model number: ISOBAN-110 manufactured by Kuraray Co., Ltd.): 0.6 parts by mass Inorganic cement (alumina cement, model number: High Alumina Cement Super S manufactured by Denka Company Limited): 5 parts by mass Powdered glass (fritted glass, model number: 4791 manufactured by Nippon Horo Yuyaku Co., Ltd.): 5.5 parts by mass Water (Tap water): 3.8 parts by mass A mixture of them was kneaded by a universal mixing stirrer (manufactured by Sankei Seisakusho K.K.).

An outer mold 11 and an inner mold 13 were set up to prepare a mold 10 of a precursor 1. The precursor 1 has an open-topped box shape having a height of 500 mm, a width of 500 mm, and a length of 700 mm. A side wall 3 and a bottom wall 5 have a thickness of 25 mm. The outer mold 11 was made entirely of an iron plate. The inner mold 13 was made of expanded polystyrene (EPS: expansion ratio 90), and a tape (PYOLAN CLOTH ADHESIVE TAPE manufactured by Nitoms, Inc.) was adhered to the entire surface of the inner mold 13. Vaseline (manufactured by Chukyo Yushi Co., Ltd.) was applied as a releasing agent onto the cavity-forming surfaces of the outer mold 11 and the inner mold 13.

The kneaded mixture was filled into the cavity of the mold 10 and dried in a general-purpose drying furnace under conditions of 80° C. for 15 hours without removing the mold 10. As a result, the inner mold 13 shrank and therefore could easily be removed.

A protective film 7 was applied onto the upper edge of side wall of the dried precursor 1. The material of the protective film 7 was obtained by dispersing particles of zirconia in a binder. The zirconia used here was G325F (product number) manufactured by Fukushima Steel Works Co., Ltd. The binder used was ALKONPATCH PT85U (product name) manufactured by Calderys Japan Co., Ltd. The mixing ratio between the zirconia and the binder was 3:7 (mass ratio). The thickness of the protective film 7 applied was 1 to 2 mm as measured by eye.

The protective film 7 was dried, and then the precursor 1 was placed in a sintering furnace. At this time, a retainer 20 was set up as shown in FIG. 4. As a first retainer 21, fire-proof bricks were used. The first retainer 21 was set up so as to be in close contact with the outer surface of the side wall 3. A second retainer 23 was set so as to cover the first retainer 21 and the side wall 3 without being forcedly fitted to them.

Then, the precursor 1 was sintered at a maximum temperature of 1100° C. for 27 hours. Conditions for temperature rise to the maximum temperature and conditions for cooling after sintering are not particularly limited, and may be those generally used.

The thus obtained ceramic filter retained the shape of the precursor. The ceramic filter could be used in an aluminum molten metal bath. The ceramic filter of this example was superior in durability to a conventional ceramic filter formed by combining flat plates.

The present invention is not limited to the above description of the embodiment according to the present invention and modified examples thereof. Various modified embodiments are also included in the present invention as long as they are easily conceivable by those skilled in the art and do not depart from the scope of the claims.

REFERENCE SIGNS LIST

1 Precursor
3, 33, 53, 63 Side wall
7 Protective film

10 Mold
11 Outer mold
13 Inner mold
20 Retainer
21, 42 First retainer
23 Second retainer

The invention claimed is:

1. A method for manufacturing an integrally-formed open-topped tubular ceramic filter for removing contaminant from molten metal, the method comprising the steps of:
   kneading an aggregate comprising ceramic particles, a predetermined binding agent, and water to prepare a mixture;
   integrally forming a precursor of an open-topped tubular ceramic filter from the prepared mixture;
   drying the precursor;
   coating only part of the dried precursor with a layer made of a material that is stable against the molten metal and an oxide thereof and that has a sintering temperature lower than a sintering temperature of the precursor, wherein upper edges of an outer surface and an inner surface of a side wall of the precursor are coated;
   setting up a retainer for the dried precursor to support the side wall of the precursor, wherein the precursor of the open-topped tubular ceramic filter is set with an open end thereof facing upward and the side wall extending in a vertical direction;
   subsequently sintering the precursor; and
   removing the retainer after sintering.

2. An integrally-formed open-topped tubular ceramic filter produced by a method according to claim 1, the ceramic filter comprising a sintered body of ceramic particles capable of allowing molten metal to pass therethrough, the ceramic filter having a bottom wall and a side wall vertically extending from the bottom wall so as to have a height of 500 mm or more.

3. The ceramic filter according to claim 2, wherein an upper edge of an opening provided at a top of the ceramic filter is coated with a protective film made of a material that is stable against the molten metal and an oxide thereof and that has a sintering temperature lower than a sintering temperature of the ceramic particles.

4. The manufacturing method according to claim 1, wherein the layer obtained by the step of coating has a width of 50 to 400 mm.

5. A method for manufacturing an integrally-formed open-topped tubular ceramic filter for removing contaminant from molten metal, the method comprising the steps of:
   kneading a mixture of an aggregate comprising ceramic particles, a predetermined binding agent, and water to prepare dough;
   integrally forming a precursor of an open-topped tubular ceramic filter from the prepared dough;
   drying the precursor;
   coating only part of the dried precursor with a layer made of a material that is stable against the molten metal and an oxide thereof and that has a sintering temperature lower than a sintering temperature of the dough of the precursor, wherein upper edges of an outer surface and an inner surface of a side wall of the precursor are coated; and
   subsequently sintering the precursor.

6. The manufacturing method according to claim 5, wherein the layer obtained by the step of coating has a width of 50 to 400 mm.

7. An integrally-formed open-topped tubular ceramic filter produced by a method according to claim 5, the ceramic filter comprising a sintered body of ceramic particles capable of allowing molten metal to pass therethrough, the ceramic filter having a bottom wall and a side wall vertically extending from the bottom wall so as to have a height of 500 mm or more.

8. The ceramic filter according to claim 7, wherein an upper edge of an opening provided at a top of the ceramic filter is coated with a protective film made of a material that is stable against the molten metal and an oxide thereof and that has a sintering temperature lower than a sintering temperature of the ceramic particles.

9. A method for manufacturing an integrally-formed open-topped tubular ceramic filter for removing contaminant from molten metal, the method comprising the steps of:
   kneading an aggregate comprising ceramic particles, a predetermined binding agent, and water to prepare a mixture;
   integrally forming a precursor of an open-topped tubular ceramic filter from the prepared mixture;
   drying the precursor; and
   subsequently sintering the precursor, wherein
   in the step of integrally forming a precursor, the mixture is filled into a space between an outer mold and an inner mold, wherein the inner mold is made of a foamed resin material and a surface thereof is coated with a heat-shrinkable resin tape as a protective film, and
   in the drying step, the precursor is warmed together with the inner mold to thermally shrink the inner mold.

10. The manufacturing method according to claim 9, wherein in the sintering step, a side wall of the precursor is supported by another member.

11. An integrally-formed open-topped tubular ceramic filter produced by a method according to claim 9, the ceramic filter comprising a sintered body of ceramic particles capable of allowing molten metal to pass therethrough, the ceramic filter having a bottom wall and a side wall vertically extending from the bottom wall so as to have a height of 500 mm or more.

12. The ceramic filter according to claim 11, wherein an upper edge of an opening provided at a top of the ceramic filter is coated with a protective film made of a material that is stable against the molten metal and an oxide thereof and that has a sintering temperature lower than a sintering temperature of the ceramic particles.

* * * * *